United States Patent
Cooper et al.

[45] Feb. 29, 1972

[54] LASER STRUCTURES

[72] Inventors: Alfred R. Cooper, Cleveland Heights, Ohio; Charles Gilbert Young, Storrs, Conn.

[73] Assignee: American Optical Corporation, Southbridge, Mass.

[22] Filed: Oct. 2, 1967

[21] Appl. No.: 672,307

[52] U.S. Cl. ................................................ 331/94.5
[51] Int. Cl. ............................................... H01s 3/02
[58] Field of Search ................................... 331/94.5

[56] References Cited

UNITED STATES PATENTS

| 3,533,013 | 10/1970 | Seitz | 331/94.5 |
|---|---|---|---|
| 3,455,666 | 7/1969 | Bazinet | 331/94.5 X |
| 3,356,966 | 12/1967 | Miller | 331/94.5 |
| 3,413,567 | 11/1968 | Hannwacker et al. | 331/94.5 |

OTHER PUBLICATIONS

Ross, Dieter, " Analysis of Room– Temperature cw Ruby Laser...The Ruby Laser as a Thermal Lens." Journal of Applied Physics, Vol. 37 No. 9, August 1966. pp. 3587–3594.

*Primary Examiner*—Ronald L. Wibert
*Assistant Examiner*—T. Major
*Attorney*—J. Albert Hultquist and Noble S. Williams

[57] ABSTRACT

Laser structures for generating and amplifying laser light, each such structure embodying an elongated core of solid laser material embedded within a cladding of solid light-transmitting material and within which cladding is also embedded a plurality of elongated flashtube chambers arranged in symmetrical relation to said core.

2 Claims, 5 Drawing Figures

PATENTED FEB 29 1972 3,646,472
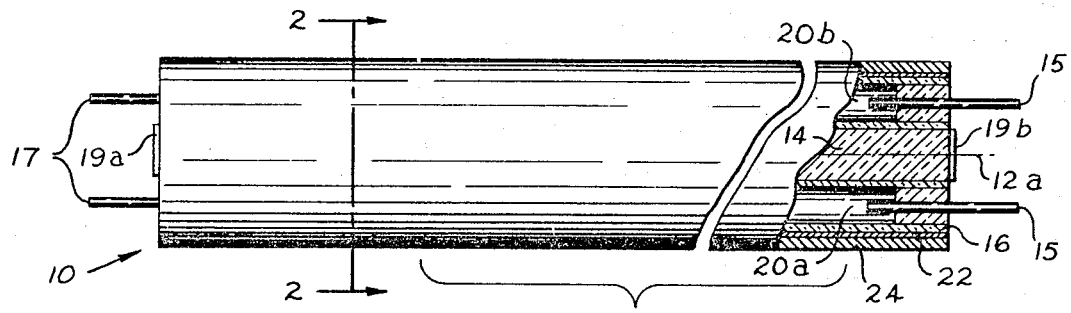
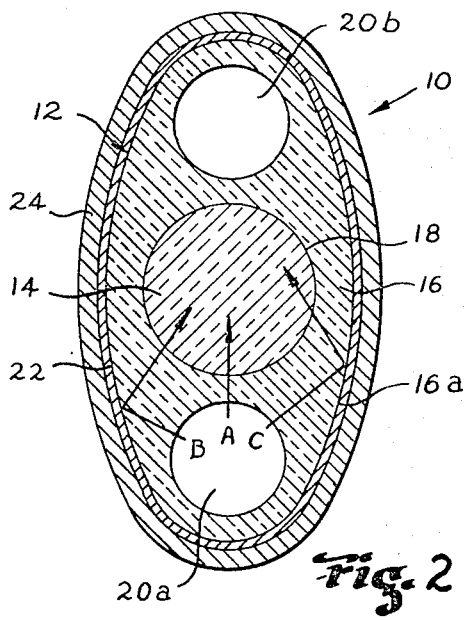
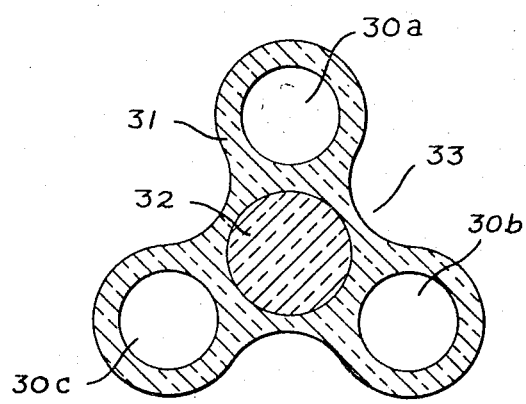
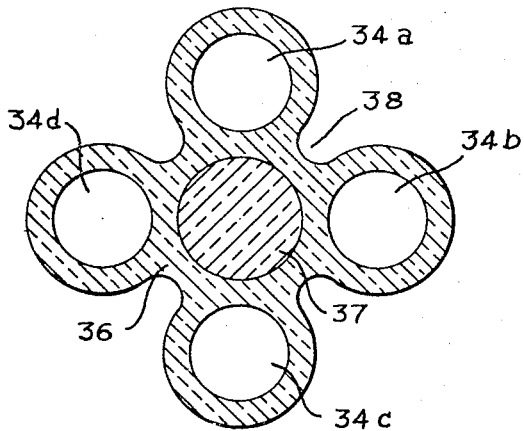
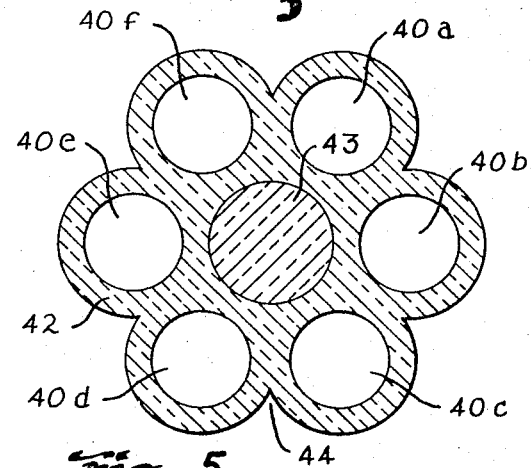
INVENTORS
ALFRED R. COOPER
CHARLES GILBERT YOUNG
BY
Noble L. Williams
ATTORNEY

LASER STRUCTURES

This invention relates to unitary laser structures and the like such as may be desired for generating or amplifying optical energy and is an improvement over the unitary laser structure disclosed and claimed in copending application, Ser. No. 539,041, filed Mar. 31, 1966, now abandoned, and assigned to the assignee of the instant application.

More particularly, the invention relates to unitary laser structures formed of solid materials and of such improved construction and arrangement as to provide high operating efficiencies, improved operating characteristics and better heat dissipation than have been possible heretofore during continuous or rapid intermittent use of fundamentally similar structures of earlier design.

The improved laser constructions of the present invention, in fact, comprise, in each case, an elongated main body member or component which is formed by a core of solid active moldable transparent laser material having a predetermined refractive index value embedded within a cladding material of substantially the same, or very nearly the same, refractive index value, said cladding also having embedded therein a plurality of elongated hollow bores which are symmetrically arranged about the core and extend throughout the length of the component in adjacent substantially parallel relation to said core and serve as flash tube chambers in such a way as to effect in said laser structure a closer optical coupling, a more stable physical arrangement of parts as well as a more evenly balanced arrangement insofar as thermal gradients within the structure are concerned, a more efficient use of the pumping optical energy and care for the heat generated than has been possible previously in said earlier laser structures of unitary design.

Even though unitary laser structures employing, in each case, an elongated core of solid moldable laser material and a flashtube chamber within a common cladding of transparent moldable material and disposed in adjacent side-by-side relation to each other are known, and such structures have already provided relatively high operating efficiencies with good heat dissipation during rapid intermittent laser operation thereof, nevertheless, they have not been satisfactory as might be desired.

For example, not only did such unitary laser structures of earlier design have their operating characteristics change during use thereof but also the amounts of such changes varied differently under different operating conditions and during different periods of use. Also, relatively high-current density was required for operating the single flashtube thereof.

The improved constructions and arrangements of the present invention, on the other hand, are such as to not only remove the undesirable limitations of said earlier unitary laser structures but also are such as to materially improve the operating characteristics and heat dissipation thereof.

In fact, it has now been found that by the use of a plurality of properly formed and properly finished hollow bores within the cladding material of the improved laser component to serve as pumping light source chambers, instead of a single chamber as previously, and by so embedding these several bores within the cladding material in a symmetrical arrangement about the core and is closely adjacent but spaced relation to each other and to said core, and with each chamber arranged to extend in a generally parallel relation to said core, not only can a stable or balanced condition for the improved laser structure be obtained but also more efficient use of the available pumping optical energy can be had.

Not only will this balanced stable condition be maintained even though the temperatures within the structure may change appreciably but also materials of differing properties may be used without affecting this balanced condition. Also, all parts of the core of the laser structure will be more uniformly irradiated by the plurality of symmetrically arranged flashtube chambers and additionally lower current densities for the plural flash tube means may be used.

An additional advantage afforded by the use of the plurality of symmetrically arranged flash tubes is that a greater total surface area is provided for cooling purposes; and such is important since most of the heat generated within the laser structure during use thereof is generated within the individual flashtube cavities.

Furthermore, when a symmetrical arrangement of several flashtubes is employed at high repetition rates, the cores of laser material may be operated at higher operating temperatures (since it is more completely surrounded by the hot flashtubes) and when such is the case more pumping optical energy will be absorbed by the laser material, due to the broadening of the absorption bands of the laser material as the temperature thereof increases.

In one modified form of the invention, by proper symmetrical arrangement of the plurality of flashtube chambers about a single core of laser material and by proper peripheral shaping of the solid cladding material, in a more or less scalloped manner, not only will good internal reflection of the pumping optical energy be provided at the outer surface of the cladding material but also the arrangement will be such that no single flashtube of the group will, to any appreciable degree, "see" directly another flashtube of the group. Accordingly, substantially no absorption of pumping energy from one flashtube by another flashtube will occur.

It is, accordingly, a principal object of the present invention to provide a unitary laser structure in the form of a relatively thin, elongated main body member or component comprising a central core formed of a solid transparent moldable active laser material and a cladding of solid light-transmitting moldable material in surrounding contacting relation to the sidewall portions thereof and to provide within said cladding material in closely adjacent and substantially parallel relation to said elongated laser core a plurality of flashtube chambers disposed in a symmetrical arrangement about said laser core, whereby physical distortions of the structure due to uneven thermal expansion, optical distortions within the structure due to dissimilar temperature gradients in different internal parts of the core and cladding, and the like, will be avoided.

It is an object of the present invention to provide in a unitary laser structure of the above character, and employing a plurality of flashtube chambers embedded within the cladding material thereof, a sufficient number of chambers and to so space said chambers relative to each other and so shape the reflective outer surfaces of the cladding material enclosing said chambers that said flastubes together will more uniformly illuminate all parts of said laser core than has been possible heretofore.

It is a further object of the present invention to provide for an elongated unitary laser structure of the above character, an outer peripheral shape or configuration for said cladding material which is such that substantially no pumping optical energy from one flashtube chamber will be allowed to pass directly to an adjacent flashtube chamber.

It is also an object of the invention to provide in a unitary laser structure of the above character a multiplicity of symmetrically arranged flashtube chambers embedded within the cladding material in such a manner as to provide a "balanced condition" substantially free from physical distortions due to thermal changes or the like and substantially free from optical distortions due to dissimilar internal temperature gradients in different parts of the laser structure, and to have the number of flashtube chambers employed sufficient to enable the flashtubes to operate at lower current density while being nearly nonabsorbent of the pumping optical energy emitted by adjacent flashtubes and while being better spectrally matched to the pumping requirements of the laser material, whereby improved operating characteristics may be obtained. Other objects and advantages of the invention will become apparent from the description which follows when considered in conjunction with the accompanying drawings wherein:

FIG. 1 is a side elevational view, partly broken away, of a laser structure embodying the present invention;

FIG. 2 is an enlarged transverse section taken substantially upon section line 2—2 of FIG. 1 and looking in the direction of the arrows; and FIGS. 3, 4 and 5 are cross-sectional views showing modified forms of the invention.

Referring to the drawing in detail and in particular FIGS. 1 and 2, it will be seen that a unitary laser device embodying the invention is indicated generally at 10 and that this device or structure comprises a thin, elongated main body member or component 12 formed by a central core 14 of solid active laser material and about which is disposed a cladding 16 of solid light-transmitting material. The material forming the core has a predetermined refractive index and the cladding material preferably has the same, or very nearly the same, refractive index as that of said core. Preferably, this solid laser material will be glass, such as a neodymium-doped barium crown laser glass, and the surrounding cladding material will be a suitable selectively absorbing glass such as a samarium-doped glass, adapted to function therewith, absorbing optical energy at the emission wavelength of the laser material on the one hand while, on the other hand, having good light-transmitting properties insofar as optical energy at the pumping wavelengths of the laser material are concerned.

Electrodes for energizing the flashtubes are indicated at 15 and 17 in FIG. 1 and highly reflective coatings upon the ends of the laser core 14 for defining a resonant laser cavity are shown at 19a and 19b. Of course, in usual fashion, one of these coatings, at least, would be slightly transmissive, if desired. Or, if desired for easier alignment and adjustment into parallelism, such reflective end coatings for establishing and defining the limits of the resonant laser cavity could be placed outwardly of the ends of the laser rod along central axis 12a and perpendicularly disposed relative thereto. Furthermore, if the structure is to be operated as a laser amplifier, rather than a laser generator, such end reflectors would be omitted entirely. In such cases, it is possible that sloping end surfaces of controlled angularity so as not to detrimentally internally reflect laser light might be used.

The cladding material 16 is, in fact, disposed in intimate optical contact with the smooth sidewall portions 18 of the elongated core 14 of laser material throughout substantially the entire length thereof, so that substantially all pumping optical energy travelling within said cladding material 16 in such directions as to impinge upon the interface 18 between the core and cladding will pass therethrough and into said laser material without experiencing any appreciable reflection at this interface.

Also contained within this cladding material 16, as shown in FIG. 2, are a pair of similar flashtube chambers 20a and 20b which are positioned closely adjacent the central core 14 and are arranged to extend in directions substantially parallel to the core; and it will be noted that these chambers are purposely arranged so as to be in diametrically opposed relation to each other at opposite sides of the elongated core 14. Also, the cladding material 16 is carefully controlled as to its peripheral shape or contour and its exposed outer side wall portions 16a are smooth and coated, as indicated at 22, with a layer of highly reflective material so as to reflect light rays impinging thereon generally back toward core 14. Thus, a "-balanced" condition as concerns thermal expansion and the like during operation of the structure will be provided. Also, it should be noted that the arrangement is such that most of the optical energy generated within the flashtube chamber 20a, for example, will be directed so as to travel with a minimum of reflection towards the core of laser material, as indicated by straight arrow A and reflected arrows B and C.

Since most of the heat generated within such unitary laser structures during operation thereof occurs within the flashtube chambers, the highest temperatures within the cladding material 16 will occur in areas closely adjacent these chambers, while in parts of the cladding material further removed from said flash tubes, lower temperature will be produced. Such is of particular interest in unitary laser devices or structures of the present invention wherein it is intended to operate said devices intermittently at high repetition rates and the highest of efficiencies are desired.

In unitary laser structures of earlier design wherein a single flashtube chamber was used, unbalanced conditions have occurred. This has been referred to, at times, as a "bi-metal effect" since two different materials have been responsible in producing such a condition. Thermal expansion has caused the laser body to bend or distort somewhat while the structure is operating. Thus, for example, in a Fabry-Perot type of laser cavity, this bending has affected the operating conditions thereof detrimentally. The reflecting surfaces upon the opposite end surfaces of the laser body have not retained their initial highly parallel condition and undesired effects have resulted. Even when such reflectors for defining the laser cavity were removed from the ends of the elongated laser body and placed in an aligned facing relation outwardly thereof, the unitary laser structures of earlier design have exhibited detrimental effects, due to uneven thermal expansion of the dissimilar materials of core and cladding, or nonsymmetrical configuration thereof.

In the structural arrangement of FIGS. 1 and 2, it will be appreciated that the two flashtube chambers 20a and 20b are similarly disposed adjacent and relative to the laser core 14, are in directly opposite positions relative to the core 14 and the adjacent cladding wall thicknesses are the same; with the result that substantially equivalent thermal expansion conditions, and the like, effecting the various parts of the laser structure will occur during laser operation and this will be so whether the flash tubes of the different arrangements of the present invention are arranged to be operated simultaneously or successively in rapid succession. Even though heat within the cladding or within the laser rod, or within both, may cause expansion of the solid core and cladding materials thereof, nevertheless, the core 14 of laser material will remain substantially straight and stable and, accordingly, very little, if any, effect due to heat building up in the structure during high repetition rate operation thereof will occur.

In FIGS. 3 and 4, modified forms of the invention are shown. In these two Figures, slightly different cross sections of laser structures are shown. In one Figure, a group of three flashtube chambers 30a, 30b and 30c are employed within the cladding 31 and are symmetrically arranged about the laser core 32, and separated by deep recesses 33, while, in the other, a group of four chambers 34a, 34b, 34c, and 34d are employed within the cladding 36 surrounding core 37 and are separated by recesses 38. Nevertheless, in both arrangements, a plurality of flashtube chambers are employed about the laser body and same are equally spaced relative thereto as well as equally spaced from adjacent flashtube chambers of the group. Thus, in both modifications of FIGS. 3 and 4, even though it cannot be said that they are each provided with diametrically opposed flashtube chambers, nevertheless, both are provided with a "balanced" or symmetrical arrangement of parts, and thus thermal expansion during operation of the laser structure will not produce bending or distortion of the laser structure, and will not produce dissimilar temperature gradients in different parts of the structure which might otherwise detrimentally affect laser operation of the structure.

An important consideration insofar as the flashtube grouping arrangements of FIGS. 3 and 4 are concerned is that each individual flashtube chamber is substantially optically isolated from the other chambers of the structure. Thus, pumping optical energy emitted by any flashtube chamber thereof will be directed substantially entirely toward the laser core, and none of this energy will be allowed to travel toward other chambers of the group so as to be absorbed thereby. Thus, it can be said that in such arrangements no flashtube chamber of the group is allowed to "see" any other chamber of the group. On the other hand, a great deal of the exterior exposed surface of the cladding material surrounding these chambers will be available for better heat dissipation.

Any reasonable number of flashtube chambers desired may be used in the present invention and disposed in equally spaced relation to one another about an elongated central laser core and within the cladding material therefor. Such a modified arrangement employing a larger number of flashtube chambers is disclosed in FIG. 5. Here a laser structure employing six separate similar flashtube chambers 40a–40f is shown within cladding 42 surrounding central core 43. While in cross-sectional arrangements shown in FIGS. 3 and 4 have been provided with relatively deep recesses 33 and 38, respectively, between adjacent flashtube chamber areas, and each recess is, in effect, well rounded at its inner part to avoid any sharp angles or the like which might provide planes of weakness within the cladding structure, it will be appreciated, nevertheless, that these recesses tend to "shield" each flashtube from adjacent flash tubes at opposite sides thereof. Thus, not only will most of the light being radiated by each flashtube be caused to travel toward the laser core but also almost no reabsorption of pumping optical energy by an adjacent flashtube will occur.

In the modified construction of FIG. 5, on the other hand, wherein a large number of flashtube chambers are employed, a scalloped effect is provided by shallow "pointed" recesses 44 between adjacent flashtube sections. These shallow recesses do not help to shield one flashtube from an adjacent flashtube; nevertheless, the cladding material adjacent these recessed areas does help reflect and direct pumping energy toward the central core 42. On the other hand, since a relatively large number of flashtube chambers are here being used, a more uniform illumination of the entire laser core surface during operation thereof will occur, a more desirable absorption of pumping optical energy by the core due to a broadening of the absorption bands of the laser material at higher temperatures will occur, lower current densities can be used, a better spectral matching between the flash tube output and the pumping wavelengths needed for the laser material being used can be had at lower current densities, and at lower current loading the flashtubes will be more transparent to their own light and thus will not detrimentally absorb pumping light from other adjacent flash tubes of the group which they might "see."

While in FIG. 5, a group of six flashtube chambers in a single unitary structure has been shown, it should be appreciated greater numbers of chambers in single structures are possible and practical. If desired, a dozen or even more chambers in a single laser structure could be employed with advantageous results. In such an arrangement employing a number of flash tubes, such as one using twelve, it might be preferable to operate certain groups of these 12 flashtubes alternately or sequentially, such as two groups each comprising every other flash tube operated alternately or three groups each comprising every third tube operated sequentially. Thus, better heat removal and operating characteristics will result.

Upon each of the different modified constructions of the present invention, it will be appreciated, not only outer highly reflective coatings, such as coating 22 in FIG. 2, of silver or aluminum, will be employed in contacting relation about the outer polished side wall portions 16a of the cladding material but also about each of these highly reflective coatings will be disposed a relatively heavy layer of metallic material of good heat conductivity, such as copper, as shown at 24 in FIG. 2, and such may be conveniently placed thereon as by an electrochemical deposition process or the like.

It should be appreciated, of course, that not only are the several advantages due to high pumping efficiencies and high heat conductivity and dissipation mentioned in the unitary laser construction disclosed in said earlier-filed copending application realized by the instant invention but additionally, due to the plurality of symmetrically arranged flashtube chambers providing a "balanced" configuration and controlled contour shapes in the instant disclosure, no so-called "bimetal" bending effects will be produced, higher operating temperatures may be employed, better spectral matching realized, greater heat dissipation accomplished and better operating characteristics realized than have been possible heretofore.

Having described our invention, we claim:

1. A unitary laser structure comprising a relatively thin, elongated core formed of a solid transparent active laser material and a cladding of solid light-transmitting material disposed in surrounding contacting relation to the side wall portions of said core throughout substantially the entire length thereof, said laser material having a predetermined refractive index value and said cladding material having a refractive index value which is of very nearly the same value as that of said laser material, said cladding material having a plurality of similar elongated cylindrical chambers formed therein in like closely adjacent but spaced relation to said core in which a gas be placed to form flashtubes to supply optical pumping energy, and each chamber being arranged to extend in a direction substantially parallel to the axis of said core throughout the length of said cladding, said plurality of chambers being equally peripherally spaced from one another about said central core, so as to effect a symmetrical arrangement relative to said core, longitudinal recesses being formed in said cladding material intermediate adjacent chambers and extending throughout the length of said cladding material, said recesses being of sufficient depth to form obstructions to prevent the transmission of any substantial amount of pumping optical energy from one chamber to another whereby distortions of said laser structure due to uneven thermal expansion or the like during laser operation will be avoided, and a highly reflective layer of material disposed upon and surrounding the outer surface of said cladding material throughout the greater part of the length thereof.

2. A laser structure as defined in claim 1 and wherein said cladding material is highly transparent to optical energy at the pumping wavelengths of said laser material but is absorptive of optical energy at the emission wavelength of said laser material.

* * * * *